(12) United States Patent
Yokoya

(10) Patent No.: US 10,237,488 B2
(45) Date of Patent: Mar. 19, 2019

(54) IMAGE CAPTURING APPARATUS AND IMAGE CAPTURING METHOD

(71) Applicant: SONY CORPORATION, Tokyo (JP)

(72) Inventor: Ryunosuke Yokoya, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/314,796

(22) PCT Filed: May 11, 2015

(86) PCT No.: PCT/JP2015/002382
§ 371 (c)(1),
(2) Date: Nov. 29, 2016

(87) PCT Pub. No.: WO2015/194091
PCT Pub. Date: Dec. 23, 2015

(65) Prior Publication Data
US 2017/0201665 A1  Jul. 13, 2017

(30) Foreign Application Priority Data

Jun. 20, 2014 (JP) ................................. 2014-127024

(51) Int. Cl.
*G06K 9/20* (2006.01)
*G06K 9/46* (2006.01)
(Continued)

(52) U.S. Cl.
CPC .......... *H04N 5/2353* (2013.01); *G03B 7/093* (2013.01); *G06K 9/2027* (2013.01);
(Continued)

(58) Field of Classification Search
CPC ............... H04N 5/2353; H04N 5/2351; H04N 5/23293; H04N 5/23232; H04N 5/2355;
(Continued)

(56) References Cited

U.S. PATENT DOCUMENTS

| 5,929,908 A | 7/1999 | Takahashi et al. |
| 7,948,538 B2 * | 5/2011 | Asoma ................... H04N 5/235 348/229.1 |

(Continued)

FOREIGN PATENT DOCUMENTS

| EP | 0725536 A2 | 8/1996 |
| JP | 08-214211 A | 8/1996 |

(Continued)

OTHER PUBLICATIONS

International Search Report and Written Opinion of PCT Application No. PCT/JP2015/002382, dated Jul. 14, 2015, 4 pages of English Translation and 5 pages of ISRWO.

(Continued)

*Primary Examiner* — Pritham D Prabhakher
(74) *Attorney, Agent, or Firm* — Chip Law Group

(57) ABSTRACT

An image capturing apparatus includes an image capturing unit having an image capturing device; and a control unit that calculates a control value of exposure conditions on the basis of an image signal for output, the image signal for output being generated by exposing the image capturing device under the exposure conditions including an exposure time for image output for every unit time, and corrects the control value on the basis of a detection image signal, the detection image signal being generated by adding at least one of an exposure time for first detection longer than the exposure time for image output and an exposure time for second detection shorter than the exposure time for image output within a unit time.

11 Claims, 14 Drawing Sheets

(51) Int. Cl.
   *G06K 9/62*   (2006.01)
   *G03B 7/093*  (2006.01)
   *H04N 5/232*  (2006.01)
   *H04N 5/235*  (2006.01)
   *H04N 5/353*  (2011.01)

(52) U.S. Cl.
   CPC ......... *G06K 9/4647* (2013.01); *G06K 9/6212* (2013.01); *H04N 5/2351* (2013.01); *H04N 5/23293* (2013.01); *H04N 5/353* (2013.01)

(58) Field of Classification Search
   CPC .... H04N 5/355; H04N 5/35536; H04N 5/235; G06K 9/4647
   USPC ...................................................... 348/207.11
   See application file for complete search history.

(56) References Cited

U.S. PATENT DOCUMENTS

| | | | | |
|---|---|---|---|---|
| 8,264,594 | B2* | 9/2012 | Yeo | G06T 5/009 |
| | | | | 348/362 |
| 9,210,334 | B2* | 12/2015 | Toyoda | H04N 5/2355 |
| 9,584,733 | B2* | 2/2017 | Doepke | H04N 5/2355 |
| 2008/0266424 | A1* | 10/2008 | Asoma | H04N 5/235 |
| | | | | 348/234 |
| 2009/0027545 | A1* | 1/2009 | Yeo | G06T 5/009 |
| | | | | 348/362 |
| 2009/0086061 | A1* | 4/2009 | Asoma | H04N 5/232 |
| | | | | 348/241 |
| 2009/0086085 | A1* | 4/2009 | Asoma | G06T 5/009 |
| | | | | 348/362 |
| 2009/0279665 | A1* | 11/2009 | Takahashi | A61B 6/00 |
| | | | | 378/62 |
| 2011/0149129 | A1* | 6/2011 | Kim | H04N 5/2351 |
| | | | | 348/296 |
| 2014/0125863 | A1* | 5/2014 | Toyoda | H04N 5/2355 |
| | | | | 348/362 |
| 2014/0267828 | A1* | 9/2014 | Kasai | H04N 9/045 |
| | | | | 348/229.1 |
| 2014/0340538 | A1* | 11/2014 | Muukki | H04N 1/2112 |
| | | | | 348/218.1 |
| 2015/0097978 | A1* | 4/2015 | Lee | H04N 5/2355 |
| | | | | 348/208.6 |
| 2015/0130967 | A1* | 5/2015 | Pieper | H04N 5/2355 |
| | | | | 348/239 |

FOREIGN PATENT DOCUMENTS

| | | |
|---|---|---|
| JP | 2008-206111 A | 9/2008 |
| JP | 2011-024088 A | 2/2011 |

OTHER PUBLICATIONS

International Preliminary Report on Patentability of PCT Application No. PCT/JP2015/002382, dated Dec. 29, 2016, 5 pages of English Translation and 3 pages of IPRP.

\* cited by examiner

IMAGE CAPTURING APPARATUS AND IMAGE CAPTURING METHOD

CROSS REFERENCE TO RELATED APPLICATIONS

This application is a U.S. National Phase of International Patent Application No. PCT/JP2015/002382 filed on May 11, 2015, which claims priority benefit of Japanese Patent Application No. JP 2014-127024 filed in the Japan Patent Office on Jun. 20, 2014. Each of the above-referenced applications is hereby incorporated herein by reference in its entirety.

TECHNICAL FIELD

The present technology relates to an image capturing apparatus and an image capturing method, and in particularly to an image capturing apparatus and image capturing method that an exposure control is improved.

BACKGROUND ART

In an image capturing apparatus, brightness of a captured image can be controlled by adjusting an exposure amount of an image capturing device such as CMOS (Complementary Metal Oxide Semiconductor), CCD (Charge Coupled Device) with a control of a diaphragm and a shutter speed. However, when a backlight scene having a relatively great brightness difference is captured, there may be generated clipped whites caused by exposure saturation and crushed shadows caused by insufficient exposure due to an insufficient dynamic range of the image capturing device.

There is a known technology that prevents the clipped whites and the crushed shadows due to the insufficient dynamic range. For example, Patent Document 1 discloses a technology that a captured image having a wide dynamic range with no clipped whites and crushed shadows is acquired by exposing twice an image capturing device for different exposure times in a unit period (1 field period=1/60 sec), and synthesizing two exposure image signals by signal processing. However, some problems have been pointed out in the known technology.

[Patent Document 1] Japanese Patent Application Laid-open No. 2011-176880

SUMMARY OF INVENTION

Problem to be Solved by the Invention

The image capturing apparatus has still unsolved problems relating to an exposure control, e.g., clipped whites and crushed shadows are easily generated due to an insufficient dynamic range upon image capturing under the condition that a brightness difference is relatively great. Furthermore, there are a variety of problems to be solved as to performance including an improvement of a captured image quality and an increase in speed.

In view of the above-described circumstances, an object of the present technology is to provide an image capturing apparatus and an image capturing method having more improved performances.

Means for Solving the Problem

In order to solve the above-described problems, an image capturing apparatus according to a first embodiment of the present technology includes an image capturing unit having an image capturing device; and a control unit that calculates a control value of exposure conditions on the basis of an image signal for output, the image signal for output being generated by exposing the image capturing device under the exposure conditions including an exposure time for image output for every unit time, and corrects the control value on the basis of a detection image signal, the detection image signal being generated by adding at least one of an exposure time for first detection longer than the exposure time for image output and an exposure time for second detection shorter than the exposure time for image output within a unit time.

In the image capturing apparatus according to the first embodiment of the present technology, the control unit may be configured to, in the image signal for output, add the exposure time for the first detection when a percentage of the number of pixels having a brightness value corresponding to a lower limit value of a dynamic range of the image capturing device in all exceeds a first threshold value, and add the exposure time for the second detection when a percentage of the number of pixels having a brightness value corresponding to an upper limit value of a dynamic range of the image capturing device in all exceeds a second threshold value.

The control unit may be configured to detect a main object from the detection image signal captured at at least one of the exposure time for the first detection and the exposure time for the second detection, correct the control value so as to increase an exposure amount when the main object is detected from the image signal for the first detection captured at the exposure time for the first detection, and correct the control value so as to increase an exposure amount when the main object is detected from the image signal for the second detection captured at the exposure time for the second detection.

The image capturing apparatus according to the first embodiment of the present may further include a detecting unit that generates histogram information showing a pixel number for every brightness value from the image signal for the detection, and the control unit may be configured to calculate position information of a representative brightness value of the main object in the histogram, and to correct the control value based on the position information.

The control unit may be configured to, when the main objects are detected from both of the image signal for the first detection and the image signal for the second detection, compare detection results of the main objects, select the position information calculated about one of the main objects on the basis of comparison results, and correct the control value on the basis of the position information.

The control unit may be configured to lengthen the exposure time for the first detection when the representative brightness value of the main object detected from the image signal for the first detection is within the range near the lower limit value of the histogram, and shorten the exposure time for the second detection when the representative brightness value of the main object detected from the image signal for the second detection is within the range near the upper limit value of the histogram.

The control unit may be configured to stop addition of the exposure time for the first detection and the exposure time for the second detection when the exposure time for the first detection and the exposure time for the second detection longer than a remaining time that the unit time is subtracted from the exposure time for detection.

The control unit may be configured to generate displaying data items in which the histogram information is visualized, and display the displaying data items on a displaying unit.

Effects of the Invention

As described above, according to the present technology, performances of the image capturing apparatus can be improved.

It should be noted that the effect described here is not necessarily limitative and may be any effect described in the present disclosure.

MODES FOR CARRYING OUT THE INVENTION

Hereinafter, embodiments according to the present technology will be described with reference to the drawings.

First Embodiment

[Overview]

In an image capturing apparatus, exposure conditions such as a diaphragm value and a shutter speed (exposure time) are controlled such that brightness of a captured image signal becomes appropriate.

However, in the case of image capture under the condition that a difference between brightness values of the image signal in a one frame becomes relatively great, for example, in the case of backlight image capturing, a dynamic range of an image capturing device forms an obstacle, whereby the exposure conditions may not be corrected appropriately.

Figure 1:
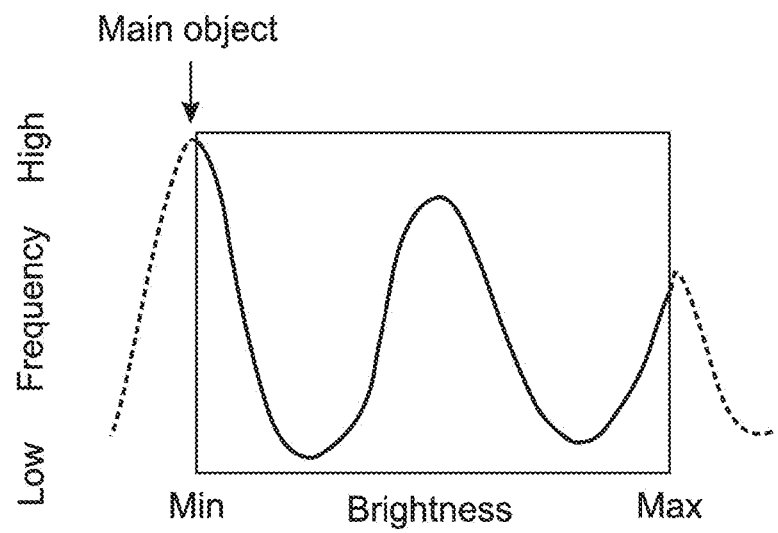
FIG. 1 is a diagram showing an illustrative histogram showing a relationship between brightness (horizontal axis) and a pixel number (vertical axis) in an image signal for one frame.

FIG. 1 is a diagram showing an illustrative histogram showing a relationship between brightness (horizontal axis) and a pixel number (vertical axis) in an image signal for one frame. Here, the range of the brightness value that is limited by the dynamic range of the image capturing device is represented by from Min (lower limit value) to Max (upper limit value) of the brightness value. In FIG. 1, a solid line represents a histogram within the dynamic range, and a dotted line represents a histogram outside the dynamic range.

The histogram in FIG. 1 shows that a part of an image of a main object has crushed shadows. The reason is that the brightness value of a part of pixels constituting the image of the main object that an image capturer, i.e., a user tries to capture is actually lower than the Min (lower limit value) within the range of the brightness value that can be detected due to the limit by the dynamic range. In this case, right brightness information at a region of the crushed shadows is not provided, whereby the exposure conditions are not corrected properly.

Figure 2:
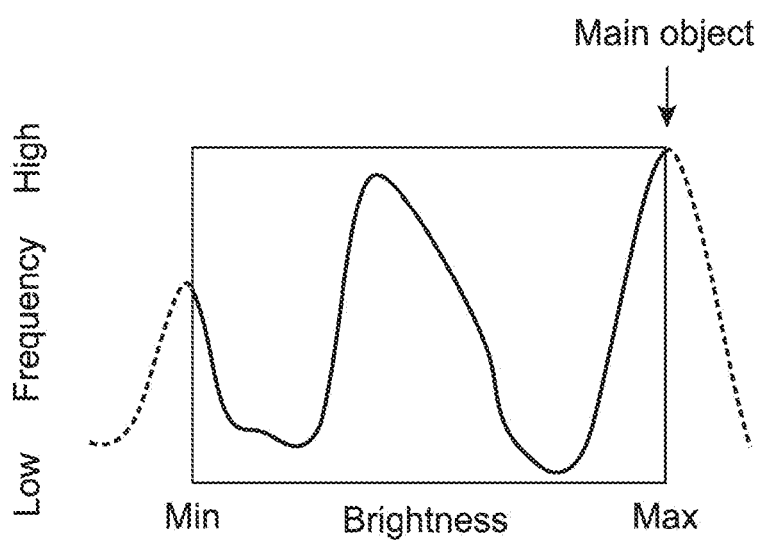
FIG. 2 A diagram showing other illustrative histogram.

A histogram in FIG. 2 shows that a part of an image of the main object has clipped whites. The reason is that the brightness value of a part of pixels constituting the image of the main object exceeds the Max (upper limit value) within the range of the detectable brightness value due to the limit by the dynamic range. Also in this case, right brightness information at a region of the clipped whites is not provided, whereby the exposure conditions are not corrected properly.

Figure 3:
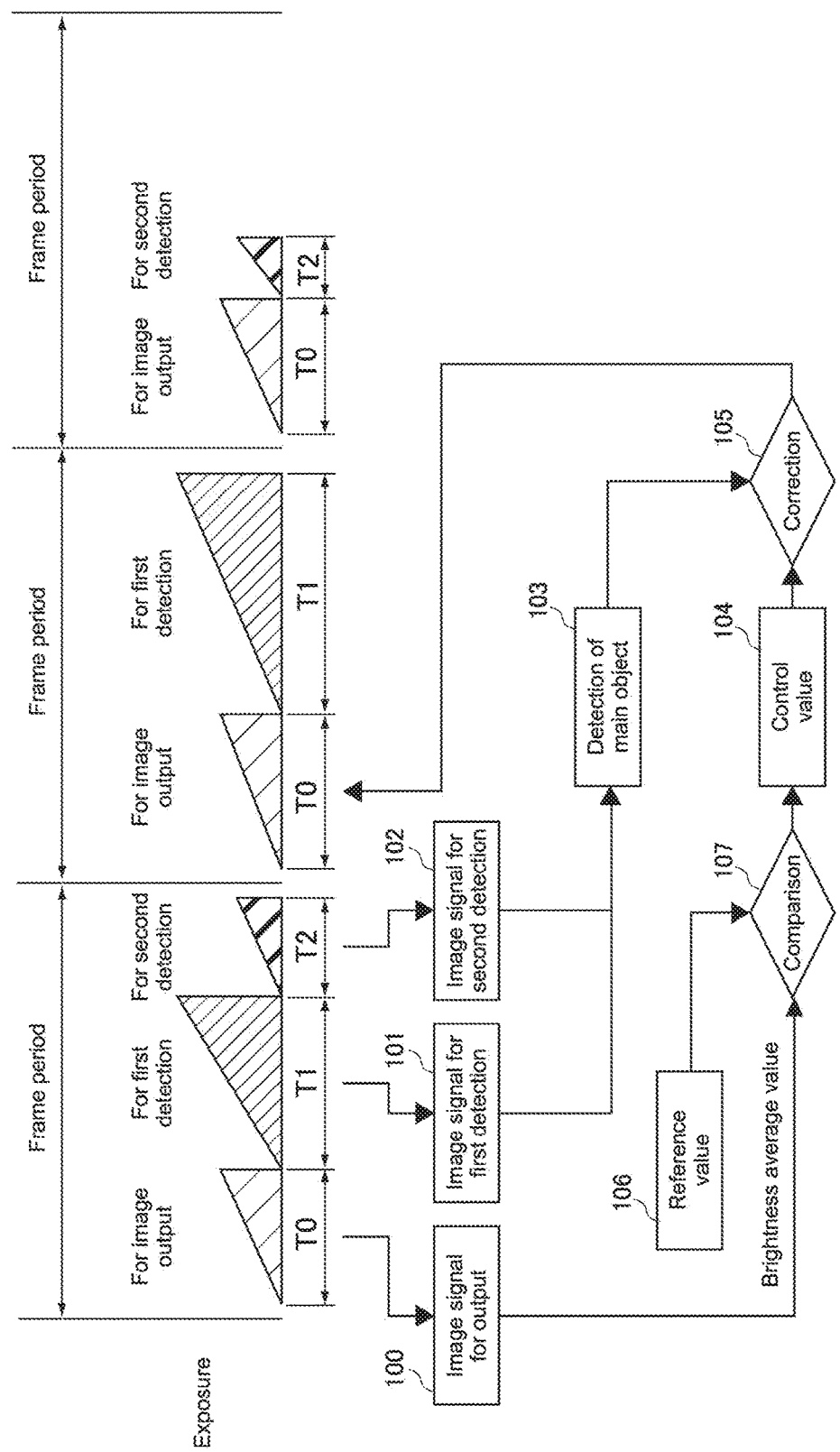
FIG. 3 A diagram showing an overview of an operation of an image capturing apparatus according to a first embodiment of the present technology.

FIG. 3 is a diagram showing an overview of an operation of an image capturing apparatus according to a first embodiment of the present technology that solves the problems.

According to the image capturing apparatus of this embodiment, when the crushed shadows or the clipped whites are generated on the captured image signal, in addition to an exposure time T0 on the basis of the exposure conditions for image output, at least one of an exposure time T1 for the first detection longer than the exposure time T0 and an exposure time T2 for the second detection shorter than the exposure time T0 is added in a frame.

In other words, in a captured image signal 100 captured at the exposure time T0 on the basis of the exposure conditions for image output (hereinafter referred to as an "image signal for output 100", as appropriate), when a percentage of the region having the crushed shadows occupied in all exceeds the first threshold value, the exposure time T1 for the first detection longer than the exposure time T0 is added in addition to the exposure time T0 on the basis of the exposure conditions for image output in a next frame.

In addition, in the image signal for output 100 captured at the exposure time T0 on the basis of the exposure conditions for image output, when the region having the clipped whites occupied in all exceeds the second threshold value, the exposure time T2 for the second detection shorter than the exposure time T0 is added in addition to the exposure time T0 on the basis of the exposure conditions for image output in a next frame.

Note that the first threshold value and the second threshold value may be the same or different.

The order of the exposure time T0 on the basis of the exposure conditions for image output, the exposure time T1 for the first detection and the exposure time T2 for the second detection in the frame is not limited to those shown in FIG. 3. For example, the exposure time T0 may be provided after the exposure time T1 for the first detection and the exposure time T2 for the second detection.

The exposure conditions for image output are the exposure conditions for capturing an image that is displayed or recorded in a typical image capturing apparatus. The exposure conditions are determined by the diaphragm value and the exposure time T0 in the image capturing unit. The present technology assumes that the exposure conditions are controlled by adjusting at least the exposure time T0. In other words, the control of the exposure conditions is performed by adjusting both of the diaphragm value and the exposure time T0, or only the exposure time T0.

Figure 4:
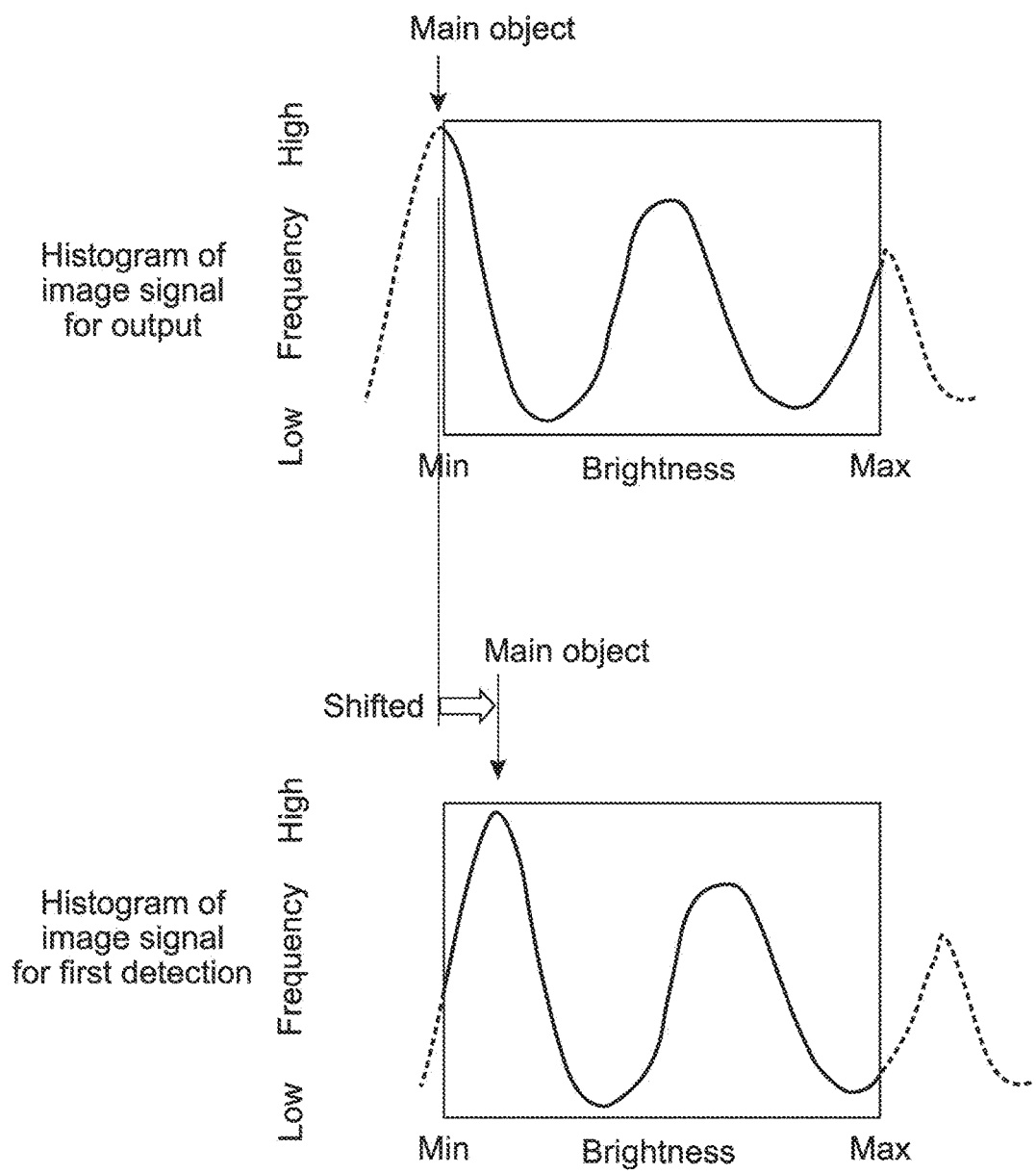
FIG. 4 A diagram showing a histogram of an image signal captured at an exposure time T1 for first detection by comparing to a histogram of an image signal captured under exposure conditions for image output.

The captured image signal at the exposure time T1 for the first detection is referred to as an "image signal for the first detection 101" as appropriate. As shown in FIG. 4, by the image capture at the exposure time T1 for the first detection, the range of the detected brightness value shifts to a low brightness side from the range of the detected brightness value when the image is captured under the exposure conditions for image output. Therefore, when the image is captured under the exposure conditions for image output, a right brightness value will be detected for the image having the crushed shadows due to the limit by the dynamic range.

Figure 5:
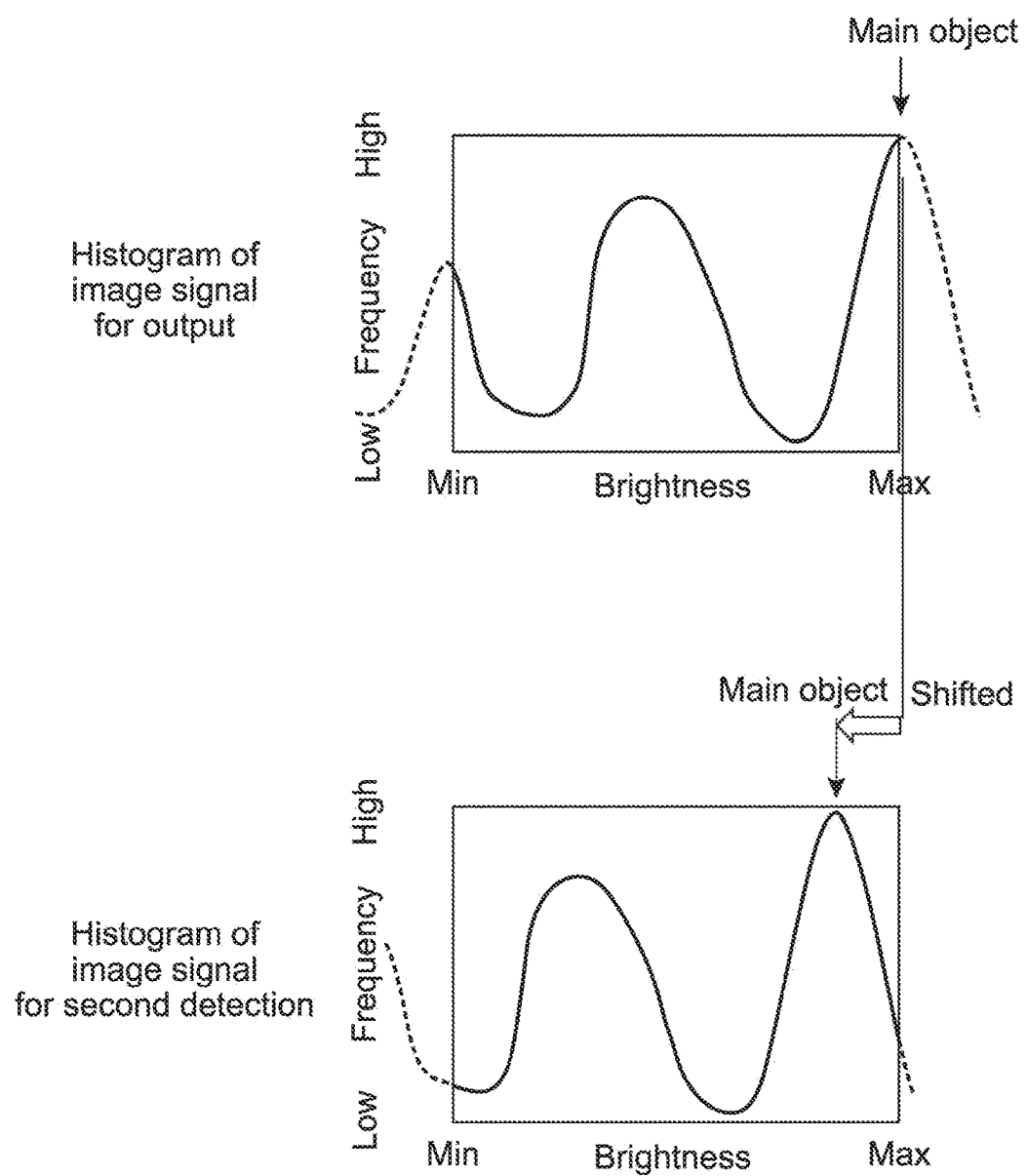
FIG. 5 A diagram showing a histogram of an image signal captured at an exposure time T2 for second detection by comparing to a histogram of an image signal captured under exposure conditions for image output.

In addition, the captured image signal at the exposure time T2 for the second detection is referred to as an "image signal for the second detection 102" as appropriate. As shown in FIG. 5, by the image capture at the exposure time T2 for the second detection, the range of the detected brightness value shifts to a high brightness side from the range of the detected brightness value when the image is captured under the exposure conditions for image output. Therefore, when the image is captured under the exposure conditions for image output, a right brightness value will be detected for the image having the clipped whites due to the limit by the dynamic range.

Referring back to FIG. 3, a detection of the main object 103 (see FIG. 3) from the image signal for the first detection 101 and the image signal for the second detection 102 is performed, for example, by well-known or known image recognition technology such as face recognition, other object recognition, and motion vector detection from the image signal.

When the main object is detected from the image signal for the first detection 101, a control value 104 of the exposure conditions for image output is corrected so as to increase the exposure amount (correction 105). At this time, a correction amount of the control value 104 of the exposure conditions may be a predetermined value. Also, for example, in the histogram of the image signal for the first detection 101, using at least first object position information that shows a position of a representative brightness value such as an average brightness value of the main object, the correction amount may be calculated so as to expose appropriately the main object.

When the main object is detected from the image signal for the second detection 102, the control value 104 of the exposure conditions for image output is corrected so as to decrease the exposure amount (correction 105). At this time, a correction amount of the control value 104 of the exposure conditions may be a predetermined value. Also, for example, in the histogram of the image signal for the first detection 102, using at least second object position information that shows the position of the representative brightness value such as the average brightness value of the main object, the correction amount may be calculated so as to expose appropriately the main object.

Furthermore, although not representing in FIG. 3, the exposure time T1 for the first detection and the exposure time T2 for the second detection for are also corrected on the basis of the first object position information and the second object position information.

In this manner, the exposure conditions for image output may be more appropriately corrected.

The control value 104 of the exposure conditions for image output is generated on the basis of a difference generated, for example, by comparison 107 of the brightness average value of the image signal for output 100 and a reference value 106. Note that the present technology is not limited thereto. In addition, the brightness average value may be a brightness average value for a whole image signal for a frame unit or a brightness average value on a center part of the image.

Next, the image capturing apparatus according to this embodiment will be described in more detail.

[Configuration of Image Capturing Apparatus]

Figure 6:
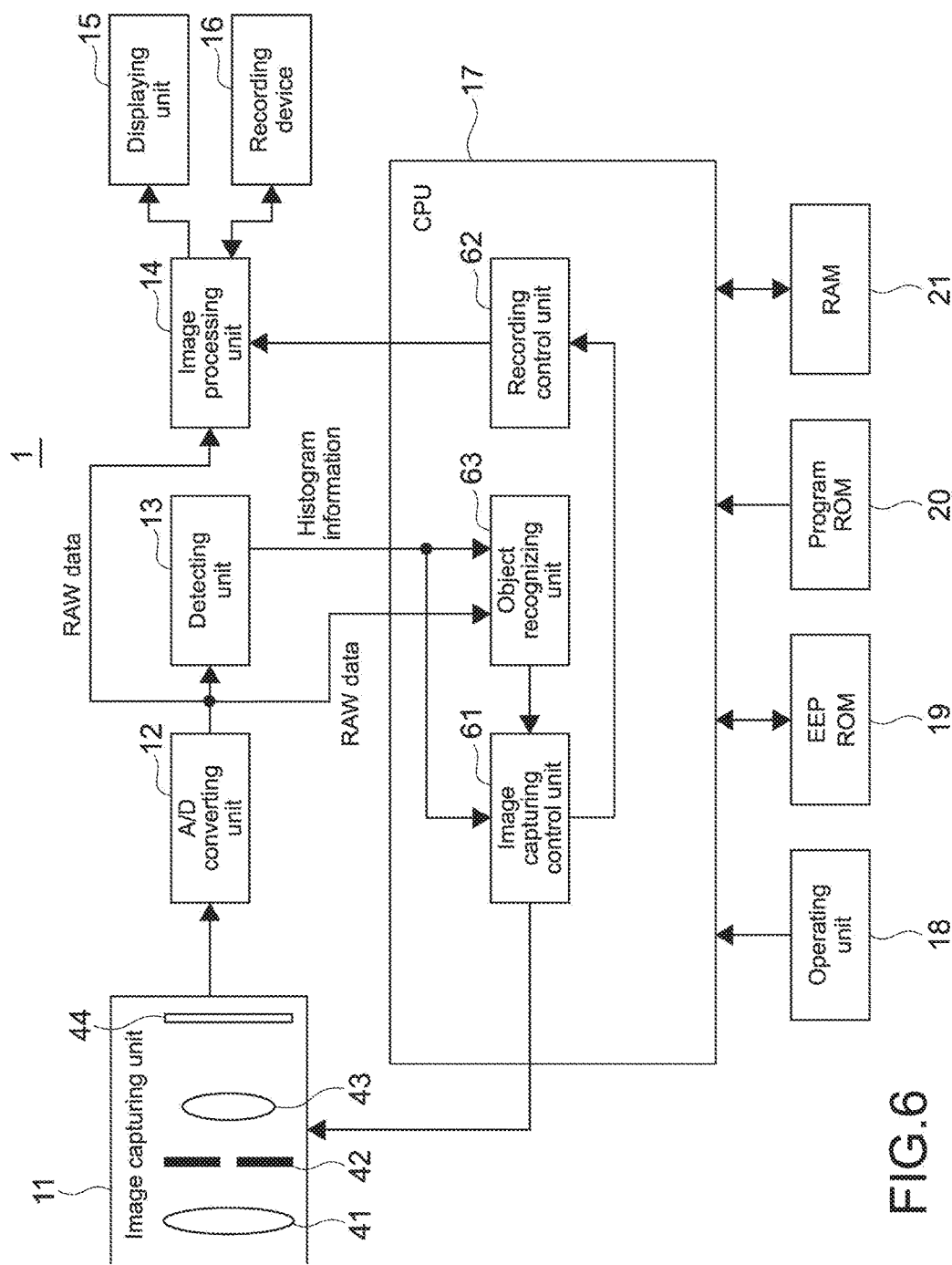
FIG. 6 A block diagram showing a configuration of an image capturing apparatus 1 of an embodiment.

FIG. 6 is a block diagram showing a configuration of an image capturing apparatus 1 of a first embodiment of the present technology.

The image capturing apparatus 1 is configured of an image capturing unit 11, an A/D converting unit 12, a detecting unit 13, an image processing unit 14, a displaying unit 15, a recording device 16, a CPU (Central Processing Unit) 17, an operating unit 18, an EEPROM (Electrically Erasable Programmable Read-Only Memory) 19, a program ROM (Read-Only Memory) 20, and a RAM (Random Access Memory) 21.

The image capturing unit 11 includes image capturing lens 41, 43, a diaphragm 42, and an image capturing device 44. The image capturing lens 41, 43 are a group of lenses that focus an image of the object on a capturing face of the image capturing device 44. The diaphragm 42 for adjusting an amount of light passed through is disposed between the group of lenses, i.e., the image capturing lens 41, 43. The diaphragm 42 is adjusted by controlling a diaphragm mechanism (not shown) by the image capturing control unit 61 that is realized by executing a program stored in the program ROM 20 by the CPU 17. Besides, the image capturing unit 11 is provides with focus adjustment, zoom adjustment and a variety of other mechanisms for adjustment. On the other hand, the CPU 17 functions as a control unit (not shown) that controls each of the focus adjustment, the zoom adjustment and a variety of other mechanisms for adjustment by executing the program stored in the program ROM 20.

The image capturing device 44 converts light focused on the capturing face passing through the image capturing lens 41, 43 and the diaphragm 42 into an analog signal for every pixel corresponding to the light intensity. The analog signal for every pixel provided by the image capturing device 44 is supplied to the A/D converting unit 12.

The A/D converting unit 12 converts the analog signal for every pixel supplied from the image capturing unit 11 into the digital signal, generates RAW data items for a frame unit, and supplies the data items to the detecting unit 13, the image processing unit 14 and the CPU 17.

The detecting unit 13 calculates a pixel number for every brightness value about RAW data items for every frame supplied from the A/D converting unit 12, and generates information of the above-described histogram. The information of the generated histogram is supplied to the image capturing control unit 61 and the object recognizing unit 63 of the CPU 17.

In the image capturing apparatus 1 according to the first embodiment of the present technology, the target RAW data items for generating the information of the histogram by the detecting unit 13 are, as shown in FIG. 3, the image signal for output 100 captured under the exposure conditions for image output, the image signal for the first detection 101 captured at the first exposure time T1 for first detection, and the image signal for the second detection 102 captured at the exposure time T2 for the second detection.

The image processing unit 14 performs development processing including a variety of adjustments and corrections such as white balance adjustment and gamma correction to the RAW data items for a frame unit according to a command from the recording control unit 62 configured as a functional module by executing the program stored on the program ROM 20 by the CPU 17. Among the image data items generated by the development processing, the captured image data items under the exposure conditions for image output are supplied to the displaying unit 15. The image data items are converted into an image file or a video file in a predetermined format suitable for recording according to the command from the recording control unit 62, and are supplied to the recording device 16. Examples of the format for recording a still picture include a TIFF (Tagged Image File Format) and a JPEG (Joint Photographic Experts Group). Examples of the format for recording a moving picture include an MPEG (Moving Picture Experts Group). Furthermore, the image data items generated by the development processing corresponding to the image signal for the first detection 101 and the image signal for the second detection 102 are supplied to the object recognizing unit 63 configured as a functional module by executing the program stored in the program ROM 20 by the CPU 17.

The displaying unit 15 includes a displaying control unit and a displaying device. The displaying control unit converts the image data items supplied from the image processing unit 14 into displaying data items suitable for the displaying device, and supplies the data items to the displaying device. In this manner, the image data items are output in a visible state for a user.

The recording device 16 includes a detachable recording medium and a media writing unit. The media writing unit writes the image file or the video file in the predetermined format supplied from the image processing unit 14 into the detachable recording medium.

The CPU 17 performs an overall control of the image capturing apparatus 1 by executing the program stored in the program ROM 20. Also, the CPU 17 functions at least as the image capturing control unit 61, the recording control unit 62 and the object recognizing unit 63 by executing the program stored in the program ROM 20.

The image capturing control unit 61 controls the image capturing device 44 of the image capturing unit 11, the diaphragm 42, focusing, or zooming. The image capturing control unit 61 controls a start timing, an exposure time and a read-out timing about the exposure for image output as the control of the image capturing device 44, as well as controls a start timing, an exposure time and a read-out timing about the exposure for the first detection and for the second detection.

The image capturing control unit 61 determines whether or not a percentage of the pixel number of the pixels having the crushed shadows (a total number of pixels having the low limit brightness value in the histogram) in all valid pixels of the image capturing device 44 exceeds the first threshold value on the basis of the histogram information that is the detection result from the captured image signal for a frame unit under the exposure conditions for image output supplied from the detecting unit 13. When the percentage exceeds the first threshold value, the exposure amount is insufficient, and the image capturing control unit 61 adds the exposure time longer than the exposure time T0 that is at least one of the exposure conditions for image output (see FIG. 3) to the next frame as the exposure time T1 for the first detection.

The image capturing control unit 61 determines whether or not a percentage of the pixel number of the pixels having the clipped whites (a total number of pixels having the upper limit brightness value in the histogram) in all valid pixels of the image capturing device 44 exceeds the second threshold value on the basis of the histogram information that is the detection result from the captured image signal for a frame unit under the exposure conditions for image output supplied from the detecting unit 13. When the percentage exceeds the second threshold value, the exposure amount is excessive, and the image capturing control unit 61 adds the exposure time shorter than the exposure time T0 that is at least one of the exposure conditions for image output to the next frame as the exposure time T2 for the second detection.

The image capturing control unit 61 corrects the control value of the exposure conditions for image output such that the exposure is tailored to the main object on the basis of first object position information and second object position information notified from the object recognizing unit 63, as described later.

Also, the image capturing control unit 61 acquires the first object position information showing the position of the representative brightness value such as the average brightness value of the main object in the histogram from the object recognizing unit 63, and determines whether or not the representative brightness value of main object is within the range near the Min (lower limit value) of the histogram. When the image capturing control unit 61 determines that the representative brightness value of the main object is within the range near the Min (lower limit value) of the histogram, the exposure time T1 for the first detection to be added to the next frame is longer, for example, for a predetermined time than the exposure time T1 for the first detection added to the current frame.

In other words, the representative brightness value of the main object is within the range near the Min (lower limit value) of the histogram, which means that a part of the main object may have crushed shadows, and the accuracy of the representative brightness value of the main object is questionable. In this case, the image capturing control unit 61 further lengthens the exposure time T1 for the first detection to decrease the number of pixels having the crushed shadows in the main object, thereby providing a more appropriate value of the representative brightness value of the main object.

Similarly, image capturing control unit 61 acquires the second object position information showing the position of the representative brightness value such as the average brightness value of the main object in the histogram from the object recognizing unit 63, and determines whether or not the representative brightness value of main object is within the range near the Max (upper limit value) of the histogram. When the image capturing control unit 61 determines that the representative brightness value of the main object is within the range near the Max (upper limit value) of the histogram, the exposure time T2 for the second detection to be added to the next frame is shorter, for example, for a predetermined time than the exposure time T2 for the second detection added to the current frame.

Similarly, the representative brightness value of the main object is within the range near the Max (upper limit value) of the histogram, which means that a part of the main object may have clipped whites, and the accuracy of the representative brightness value of the main object is questionable. In this case, the image capturing control unit 61 further shortens the exposure time T2 for the second detection to decrease or remove the clipped whites in the main object, thereby providing a more appropriate value of the representative brightness value of the main object.

The object recognizing unit 63 detects the main object from the first detection image signal captured at the exposure time T1 for the first detection and the second detection image signal captured at the exposure time T2 for the second detection. The object recognizing unit 63 acquires the histogram information that is the detection result about the first detection image signal supplied from the detecting unit 13, and supplies the first object position information that is object position information at a low brightness side showing that the position of the representative brightness value such as the average brightness value of the main object to the image capturing control unit 61. The object recognizing unit 63 acquires the histogram information that is the detection result about the second detection image signal supplied from the detecting unit 13, and supplies the second object position information that is object position information at a high brightness side showing that the position of the representative brightness value such as the average brightness value of the main object to the image capturing control unit 61.

The recording control unit 62 performs a control of development processing by the image processing unit 14 and a control of conversion of image data into a recording file format.

The operating unit 18 receives a variety of inputs for capturing from a user, i.e., an image capturer, and supplies the data corresponding to the inputs to the CPU 17. The operating unit 18 is configured, for example, of a button, a key, a lever, and a touch panel.

The EEPROM 19 is a rewritable ROM where a variety of setting data items such as a capturing parameter input by a user are stored, for example.

The program ROM 20 is a ROM where a program executed by the CPU 17 and other fixed information.

The RAM 21 is a work area (main memory) for performing arithmetic processing by the CPU 17 on the basis of the program.

The image capturing apparatus 1 may include wire or wireless communication interfaces as other configurations.

Note that the above description about the configuration is not for all configurations of the image capturing apparatus 1.

[Operation of Image Capturing Apparatus 1]

Next, in this embodiment of the image capturing apparatus 1, an operation of processing for correcting the control value of the exposure conditions for image output mainly using the exposure for detection will be described.

The operation will be described in the following order.
1. Overall Operation Flow
2. Determination of Addition of Exposure Time T1 for First Detection
3. Determination of Addition of Exposure Time T2 for Second Detection
4. Calculation of Exposure Time T1 for First Detection
5. Calculation of Exposure Time T2 for Second Detection
6. Correction of Control Value of Exposure Conditions for Image Output
7. Determination of Stop of Exposure for Detection

[1. Overall Operation Flow]

Figure 7:
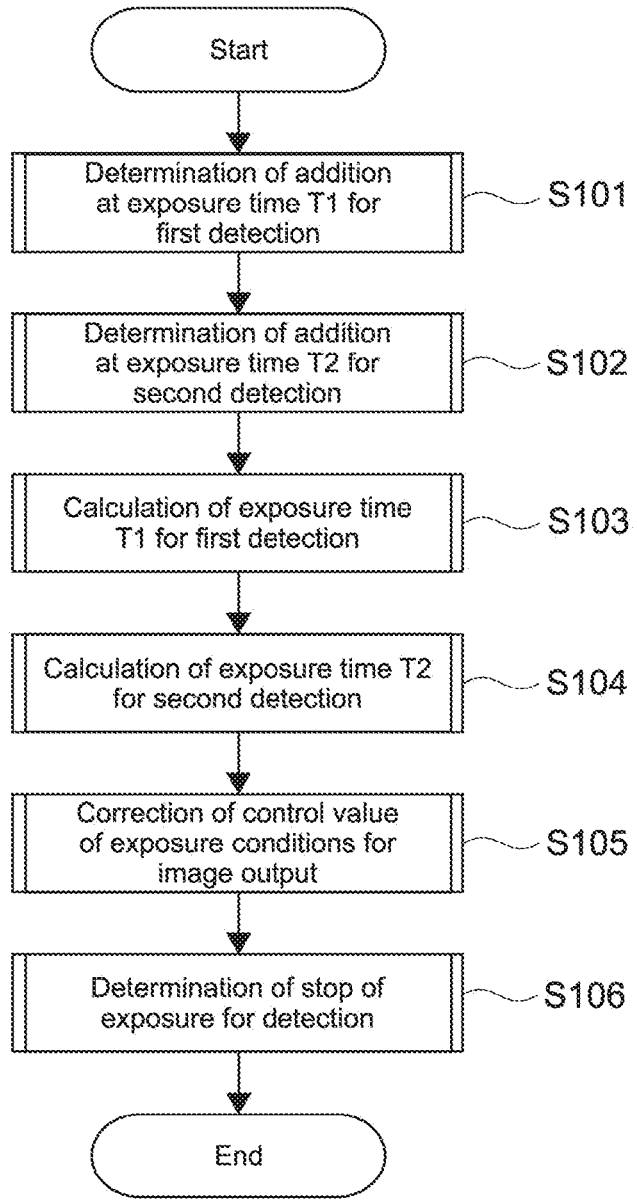
FIG. 7 A flowchart of an overall operation of the image capturing apparatus 1 according to the embodiment.

FIG. 7 is a flowchart of an overall operation of the image capturing apparatus 1 according to the embodiment.

First, the image capturing control unit 61 determines whether or not the exposure time T1 for the first detection has to be added to the next frame on the basis of the image signal for output captured under the exposure conditions for image output (Step S101). The detail of the processing will be described by a flowchart in FIG. 8 later.

Next, the image capturing control unit 61 determines whether or not the exposure time T2 for the first detection has to be added to the next frame on the basis of the same image signal for output (Step S102). The detail of the processing will be described by a flowchart in FIG. 9 later.

Any of the Steps S101 and S102 may be performed first.

Next, the image capturing control unit 61 performs determination of the exposure time T1 for the first detection of the next frame (Step S103). The detail of the processing will be described by a flowchart in FIG. 10 later.

Next, the image capturing control unit 61 performs determination of the exposure time T2 of the next frame (Step S104). The detail of the processing will be described by a flowchart in FIG. 10 later.

Any of the Steps S103 and S104 may be performed first.

Next, the image capturing control unit 61 performs determination of the exposure conditions for image output of the next frame (Step S105). The detail of the processing will be described by a flowchart in FIG. 14 later.

Finally, the image capturing control unit 61 performs processing for determining whether or not the exposure for detection is continued or stopped at the exposure time T1 for the first detection and the exposure time T2 for the second detection from the exposure time T1 for the first detection determined in Step S103, the exposure time T2 for the second detection determined in Step S104, and the exposure time T0 on the basis of the exposure conditions for image output determined in Step S105 (Step S106). The detail of the processing will be described by a flowchart in FIG. 15 later.

[2. Determination of Addition of Exposure Time T1 for First Detection]

Figure 8:
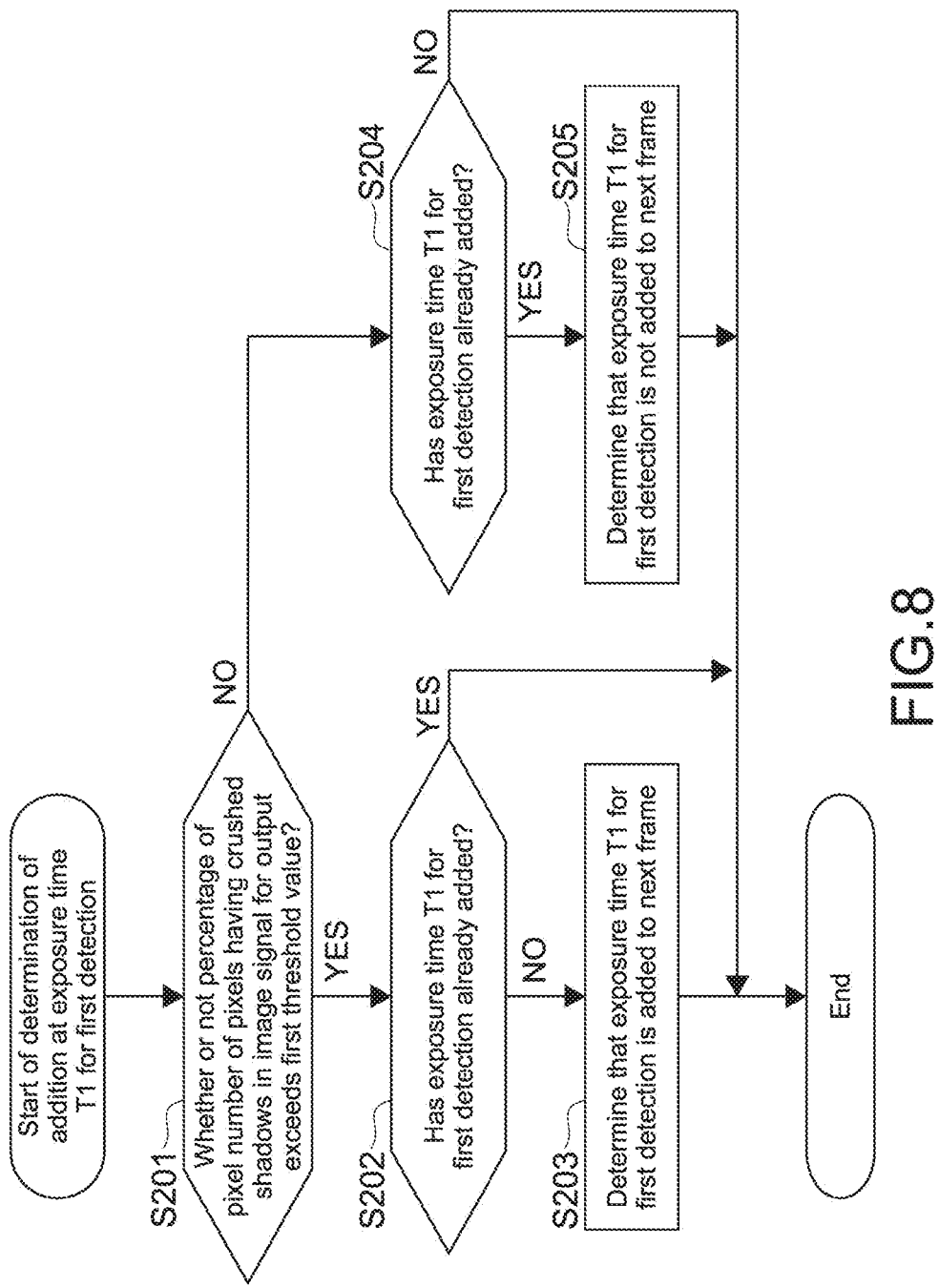
FIG. 8 A flowchart of an operation of determination of addition at the exposure time T1 for the first detection.

FIG. 8 is a flowchart of an operation of determination of addition at the exposure time T1 for the first detection.

The image capturing control unit 61 determines whether or not a percentage of the pixel number of the pixels having the crushed shadows in all valid pixels of the image capturing device 44 exceeds the first threshold value on the basis of the histogram information supplied from the detecting unit 13 about the image signal for output for a frame unit (Step S201).

Here, the pixel number having the crushed shadows is substituted by the pixel number having the brightness value being the Min (lower limit value) of the histogram.

When the percentage of the pixel number of the pixels having the crushed shadows in all valid pixels of the image capturing device 44 exceeds the first threshold value, the image capturing control unit 61 determines whether or not the exposure time T1 for the first detection has already added to the current frame (Step S202).

When the exposure time T1 for the first detection is not added to the current frame (No in Step S202), the image capturing control unit 61 determines that the exposure time T1 for the first detection is added to the next frame (Step S203), and the operation is ended.

When the exposure time T1 for the first detection has already added to the current frame (Yes in Step S202), the image capturing control unit 61 determines that the exposure time T1 for the first detection is added to the next frame as it is (Step S203), and the operation is ended.

Upon the determination in Step S201, when the percentage of the pixel number of the pixels having the crushed shadows in all valid pixels of the image capturing device 44 is less than the first threshold value (No in Step S201), the image capturing control unit 61 determines whether or not the exposure time T1 for the first detection has already added to the current frame (Step S204).

When the exposure time T1 for the first detection has already added to the current frame (Yes in Step S204), the image capturing control unit 61 determines that the exposure time T1 for the first detection is not added to the next frame (Step S205), and the operation is ended.

In Step S204, when it is determined that the exposure time T1 for the first detection is not added to the current frame (No in Step S202), the operation is ended as it is.

[3. Determination of Addition of Exposure Time T2 for Second Detection]

Figure 9:
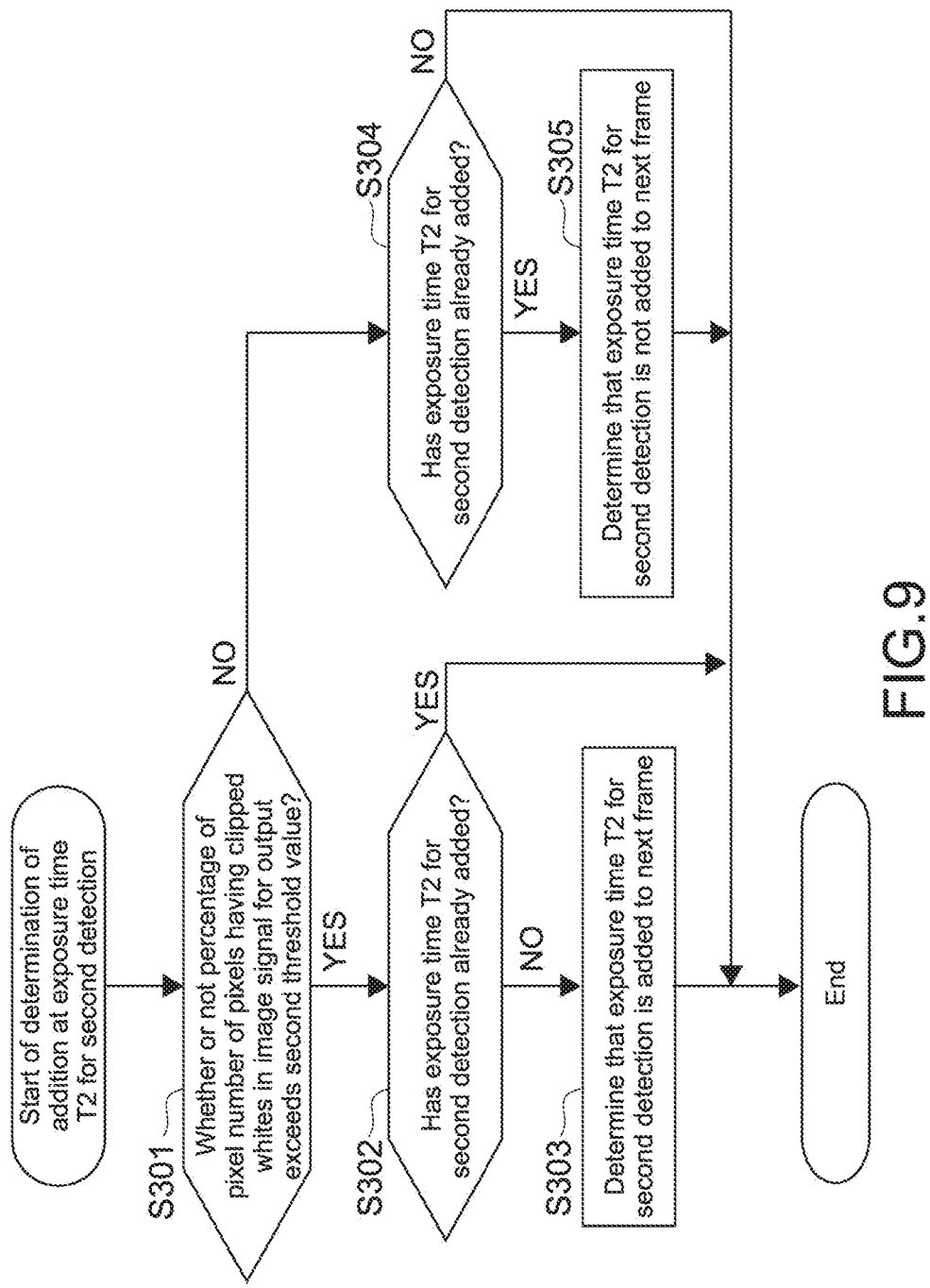
FIG. 9 A flowchart of an operation of determination of addition at the exposure time T2 for the second detection.

FIG. 9 is a flowchart of an operation of determination of addition at the exposure time T2 for the second detection.

The image capturing control unit 61 determines whether or not a percentage of the pixel number of the pixels having the clipped whites in all valid pixels of the image capturing device 44 exceeds the second threshold value on the basis of the histogram information supplied from the detecting unit 13 about the image signal for output for a frame unit (Step S301).

Here, the pixel number having the clipped whites is substituted by the pixel number having the brightness value being the Max (upper limit value) of the histogram.

When the detection result is Yes, the image capturing control unit 61 determines whether or not the exposure time T2 for the second detection has already added to the current frame (Step S302).

When the exposure time T2 for the second detection is not added to the current frame (No in Step S302), the image capturing control unit 61 determines that the exposure time T2 for the second detection is added to the next frame (Step S303), and the operation is ended.

When the exposure time T2 for the second detection has already added to the current frame (Yes in Step S302), the image capturing control unit 61 determines that the exposure time T2 for the first detection is added to the next frame as it is, and the operation is ended.

Upon the determination in Step S301, when the percentage of the pixel number of the pixels having the clipped whites in all valid pixels of the image capturing device 44 is less than the second threshold value (No in Step S301), the image capturing control unit 61 determines whether or not the exposure time T2 for the second detection has already added to the current frame (Step S304).

When the exposure time T2 for the second detection has already added to the current frame (Yes in Step S304), the image capturing control unit 61 determines that the exposure time T2 for the second detection is not added to the next frame (Step S305), and the operation is ended.

In Step S304, when it is determined that the exposure time T2 for the second detection is not added to the current frame (No in Step S304), the operation is ended as it is.

[4. Calculation of Exposure Time T1 for First Detection]

Figure 10:
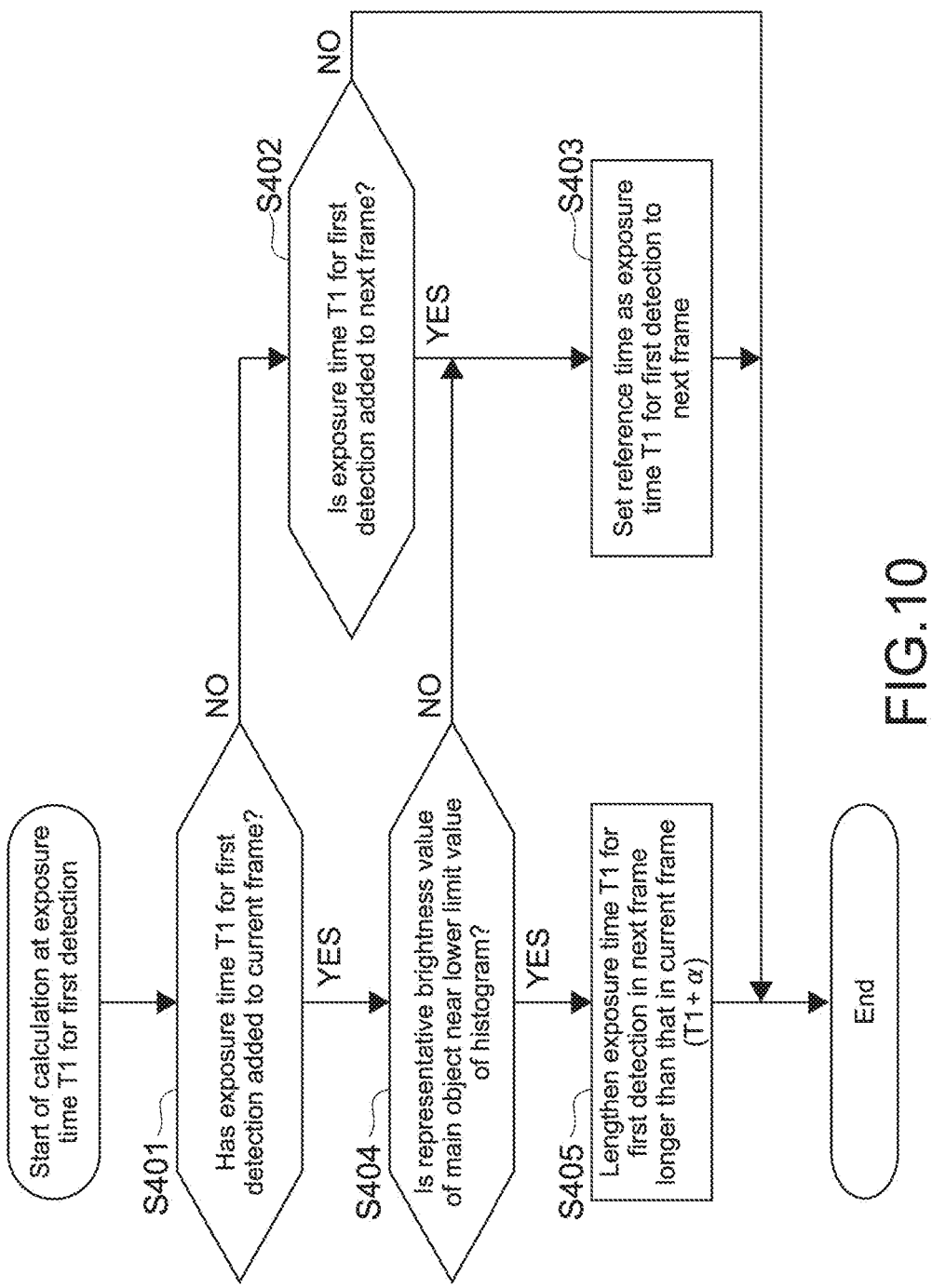
FIG. 10 A flowchart of a calculation operation at the exposure time T1 for the first detection.

FIG. 10 is a flowchart of a calculation operation at the exposure time T1 for the first detection.

First, the image capturing control unit 61 determines whether or not the exposure time T1 for the first detection is added to the current frame (Step S401). When the exposure time T1 for the first detection is not added (No in Step S401), the image capturing control unit 61 determines whether or not it is decided that the exposure time T1 for the first detection is added to the next frame by the above [2. Determination of Addition of Exposure Time T1 for First Detection] (Step S402).

When it is decided that the exposure time T1 for the first detection is added to the next frame (Yes in Step S402), the image capturing control unit 61 sets a reference time as the exposure time T1 for the first detection (Step S403), and the operation is ended. [0093] Here, the reference time is at least longer than the exposure time T0 on the basis of the exposure conditions for image input of the current frame, e.g., the time longer, for example, for a fixed time, than the exposure time T0 on the basis of the exposure conditions for image input of the current frame.

When the exposure time T1 for the first detection is not added to the next frame (No in Step S402), the operation is ended as it is.

When it is determined that the exposure time T1 for the first detection has already added to the current frame in Step S401 (Yes in Step S401), the image capturing control unit 61 requests the object recognizing unit 63 for detection of the main object.

Once the object recognizing unit 63 receives the request, the object recognizing unit 63 detects the main object from the first detection image signal captured at the exposure time T1 for the first detection. Also, the object recognizing unit 63 acquires histogram information about the first detection image signal from the detecting unit 13, generates the first object position information that shows the position of the representative brightness value such as the average brightness value of the detected main object, and supplies the first object position information to the image capturing control unit 61. The representative brightness value may be a brightness value in a maximum pixel number of the main object other than the average brightness value.

The main object may not be detected at the object recognizing unit 63. In this case, a detection error about the position of the object at the low brightness side is notified to the image capturing control unit 61, for example.

Next, the operation that the object recognizing unit 63 successfully detects the main object, and the image capturing control unit 61 is provided with the first object position information will be described.

Figure 11:
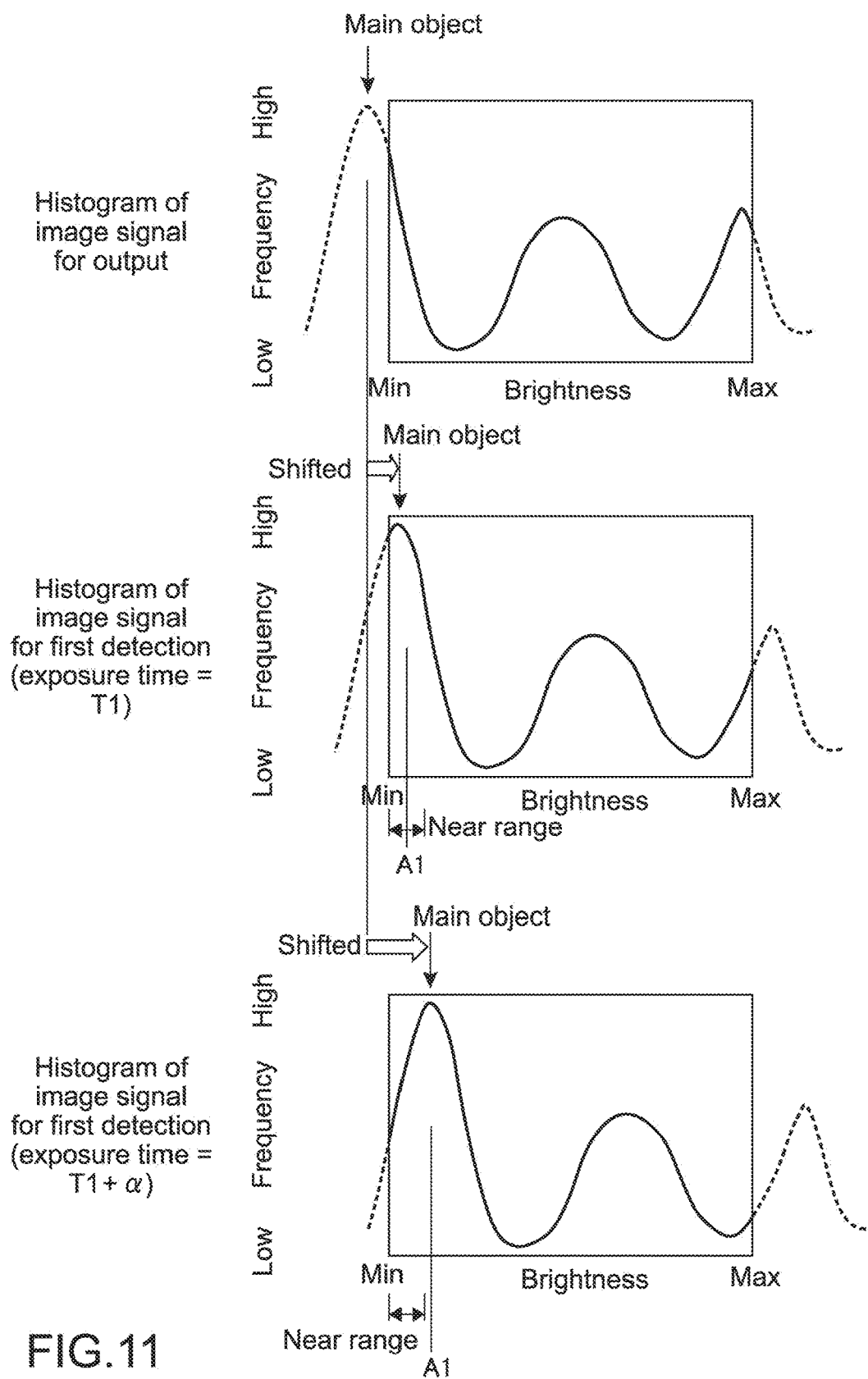
FIG. 11 A diagram for explaining the calculation at the exposure time T1 for the first detection.

The image capturing control unit 61 determines whether or not the representative brightness value A1 of the main object is within the range near the Min (lower limit value) of the histogram (within a detectable brightness value range) on the basis of the first object position information provided by the object recognizing unit 63, as shown in FIG. 11, for example (Step S404).

When the representative brightness value A1 of the main object is within the range near the Min (lower limit value) of the histogram (Yes in Step S404), the image capturing control unit 61 changes the exposure time T1 for the first detection in the next frame to the time longer, for example, for a fixed time, (T1+α) than the exposure time T1 for the first detection (reference time) added to the current frame (Step S405).

In this manner, as shown in FIG. 11, the range of the brightness value of the first detection image signal for the next frame is wholly shifted from the range of the brightness value of the first detection image signal for the current frame to a low brightness side for a time equivalent to an extended time α. The determination accuracy of the representative brightness values A1 such as the average brightness value and the maximum pixel number of the main object is improved, and a correction accuracy of the control value of the exposure conditions for image output is improved.

Also, in Step S404, when the representative brightness value A1 of the main object is at a higher brightness side than the range near the Min (lower limit value) of the histogram (No in Step S404), the image capturing control unit 61 sets the above-described reference time (the time longer for a fixed time than the exposure time T0 on the basis of the exposure conditions for image input of the current frame) as the exposure time T1 for the first detection of the next frame as it is (Step S403), and the operation is ended.

[5. Calculation of Exposure Time T2 for Second Detection]

Figure 12:
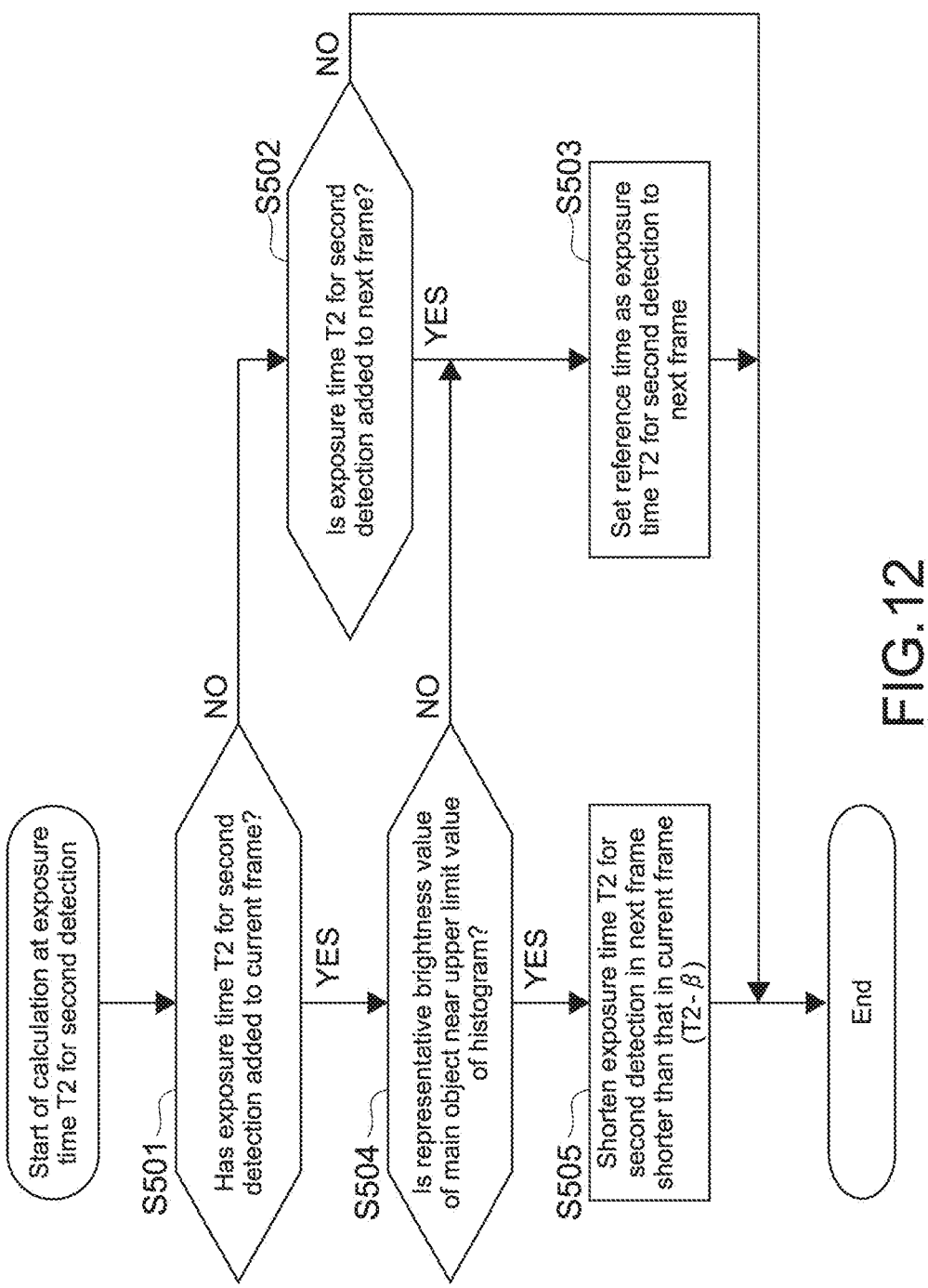
FIG. 12 A flowchart of a calculation operation at the exposure time T2 for the second detection.

FIG. 12 is a flowchart of a calculation operation at the exposure time T2 for the second detection.

First, the image capturing control unit 61 determines whether or not the exposure time T2 for the second detection is added to the current frame (Step S501). When the exposure time T2 for the second detection is not added (No in Step S501), the image capturing control unit 61 determines whether or not it is decided that the exposure time T2 for the second detection is added to the next frame by the above [3. Determination of Addition of Exposure Time T2 for Second Detection] (Step S502).

When it is decided that the exposure time T2 for the second detection is added to the next frame (Yes in Step S502), the image capturing control unit 61 sets a reference time as the exposure time T2 for the second detection (Step S503), and the operation is ended. [0106] Here, the reference time is at least shorter than the exposure time T0 on the basis of the exposure conditions for image input of the current frame, e.g., the time shorter, for example, for a fixed time, than the exposure time T0 on the basis of the exposure conditions for image input of the current frame.

When the exposure time T2 for the second detection is not added to the next frame (No in Step S502), the operation is ended as it is.

When it is determined that the exposure time T2 for the second detection has already added to the current frame in Step S501 (Yes in Step S501), the image capturing control unit 61 requests the object recognizing unit 63 for detection of the main object.

Once the object recognizing unit 63 receives the request, the object recognizing unit 63 detects the main object from the second detection image signal captured at the exposure time T2 for the second detection. Also, the object recognizing unit 63 acquires histogram information about the second detection image signal from the detecting unit 13, generates the second object position information that shows the position of the representative brightness value such as the average brightness value of the detected main object, and supplies the second object position information to the image capturing control unit 61. The representative brightness value may be a brightness value in a maximum pixel number other than the average brightness value of the main object.

When the main object is not detected at the object recognizing unit 63. A detection error about the position of the object at the high brightness side is notified to the image capturing control unit 61, for example.

Next, the operation that the object recognizing unit 63 successfully detects the main object, and the image capturing control unit 61 is provided with the second object position information will be described.

Figure 13:
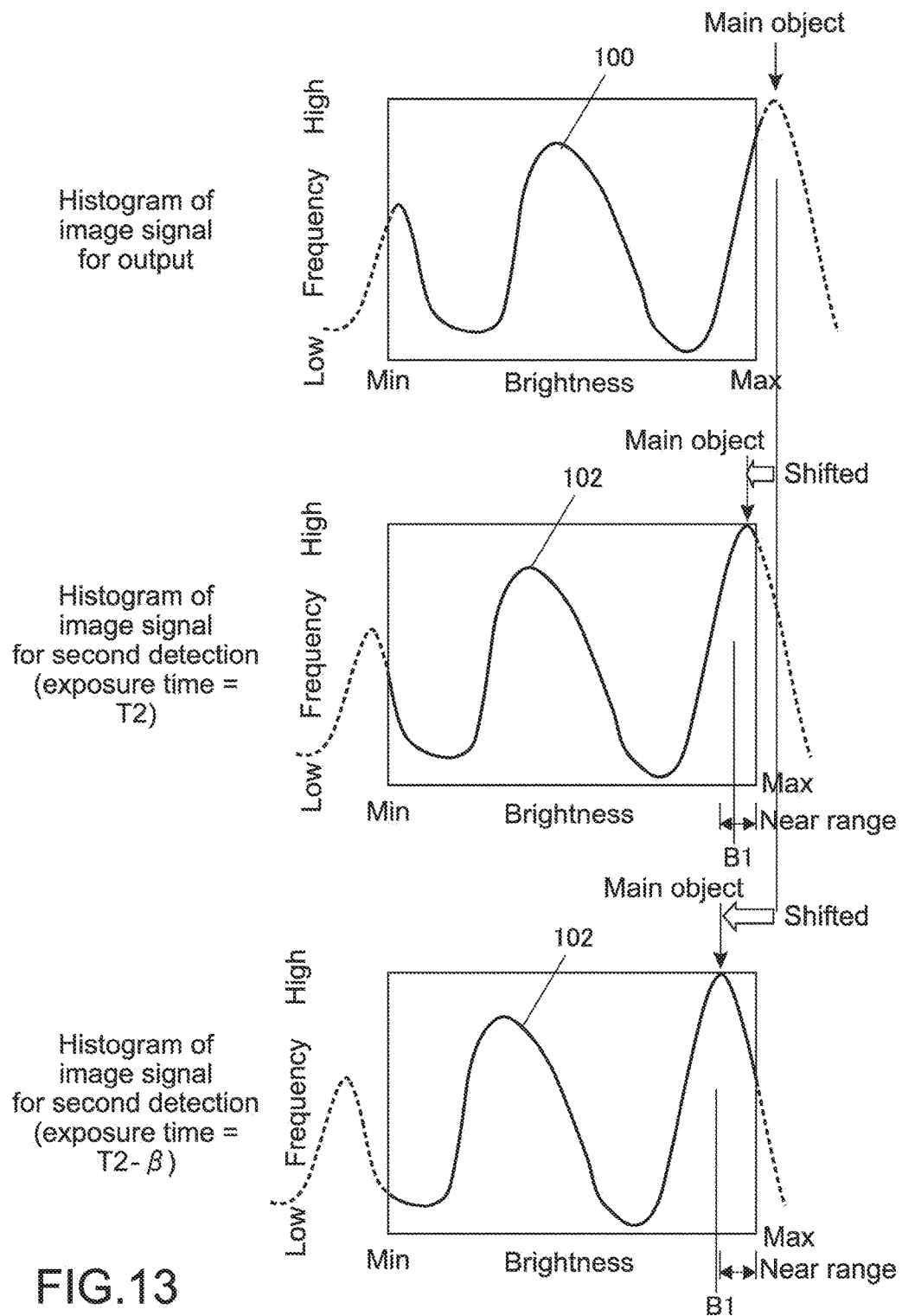
FIG. 13 A diagram for explaining the calculation at the exposure time T2 for the second detection.

The image capturing control unit 61 determines whether or not the representative brightness value B1 of the main object is within the range near the Max (upper limit value) of the histogram on the basis of the second object position information provided by the object recognizing unit 63, as shown in FIG. 13, for example (Step S504).

When the representative brightness value B1 of the main object is within the range near the Max (upper limit value) of the histogram (Yes in Step S504), the image capturing control unit 61 changes the exposure time T2 for the second detection in the next frame to the time shorter, for example, for a fixed time, (T2−β) than the exposure time T2 for the second detection (reference time) added to the current frame (Step S505).

In this manner, as shown in FIG. 13, the range of the brightness value of the second detection image signal for the next frame is wholly shifted from the range of the brightness value of the second detection image signal for the current frame to a low brightness side for a time equivalent to an extended time β. The determination accuracy of the representative brightness values B1 such as the average brightness value and the maximum pixel number of the main object is improved, and a correction accuracy of the control value of the exposure conditions for image output is improved.

Also, in Step S504, when the representative brightness value B1 of the main object is at a lower brightness side than the range near the Max (upper limit value) of the histogram (No in Step S504), the image capturing control unit 61 sets the above-described reference time (the time shorter for a fixed time than the exposure time T0 on the basis of the exposure conditions for image input of the current frame) as the exposure time T2 for the second detection of the next frame as it is (Step S503), and the operation is ended.

[6. Correction of Control Value of Exposure Conditions for Image Output]

Figure 14:
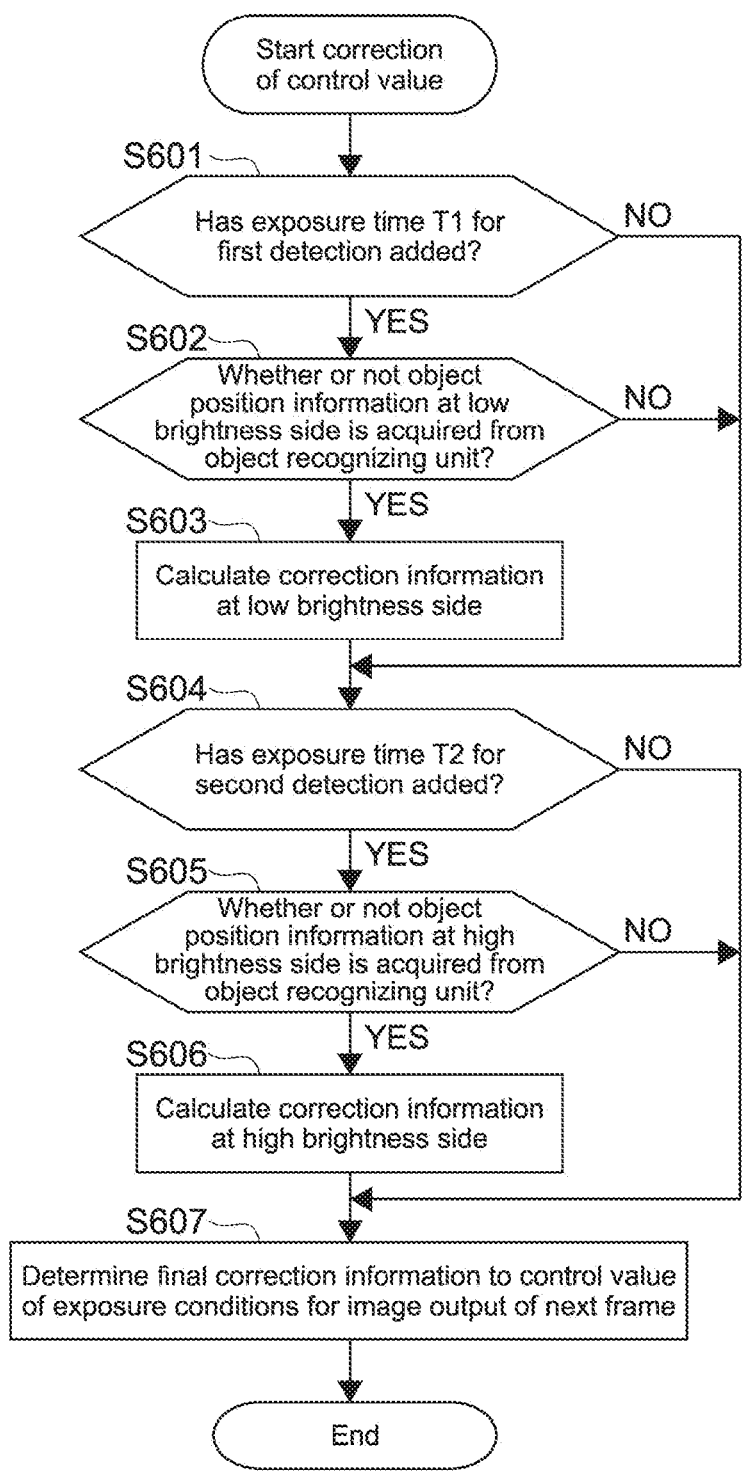
FIG. 14 A flowchart about correction of a control value of exposure conditions for image output.

FIG. 14 is a flowchart about correction of a control value of exposure conditions for image output.

In this operation, when the crushed shadows and the clipped whites are generated at the same time in the image signals having a great difference between the brightness values, processing is performed for determining a priority between correction to a low brightness side and correction to a high brightness side. The processing will be described later.

The image capturing control unit 61 determines whether or not the exposure time T1 for the first detection has already added to the current frame (Step S601).

When the exposure time T1 for the first detection has already added to the current frame (Yes in Step S601), the image capturing control unit 61 determines whether or not the first object position information is provided from the object recognizing unit 63 (Step S602). When the first object position information is provided (Yes in Step S602), the image capturing control unit 61 calculates the first correction information for correcting the control value of the exposure conditions for image output on the basis of the first object position information (Step S603).

When the image capturing control unit 61 determines that the exposure time T1 for the first detection is not added to the current frame (No in Step S601), or when a detection error of the first object position information is notified from the object recognizing unit 63 (No in Step S602), the calculation of the first correction information in Step S603 is skipped, and it moves to next Step S604.

In Step S604, the image capturing control unit 61 determines whether or not the exposure time T2 for the second detection has already added to the current frame (Step S604).

When the exposure time T2 for the second detection has already added to the current frame (Yes in Step S604), the image capturing control unit 61 determines whether or not the second object position information is provided from the object recognizing unit 63 (Step S605). When the second object position information is provided (Yes in Step S605), the image capturing control unit 61 calculates the second correction information for correcting the control value of the exposure conditions for image output on the basis of the second object position information (Step S606).

When the image capturing control unit 61 determines that the exposure time T2 for the second detection is not added to the current frame (No in Step S604), or when a detection error of the second object position information is notified from the object recognizing unit 63 (No in Step S605), the calculation of the second correction information is skipped, and it moves to next Step S607.

In Step S607, from the processing result so far, processing is performed to determine final correction information to correct the control value of the exposure conditions for image output of the next frame (Step S607).

For example, when the first correction information is acquired, and the second correction information is not acquired, the first correction information is determined as final correction information. To the contrary, when the second correction information is acquired, and the first correction information is not acquired, the second correction information is determined as final correction information. When the first correction information and the second correction information are not acquired, no final correction information is provided. Both of the first correction information and the second correction information are provided, the choice of which correction information is determined from other points of view.

When both of the first correction information and the second correction information are acquired, the following example methods to select the correction information from both.

1. The image capturing control unit 61 chooses the correction information where the main object having a high priority is detected depending on the kinds of the main object detected at the object recognizing unit 63. For example, when a human face is detected from the first detection image signal at the low brightness side, and a vehicle is detected from the second detection image signal the at the high brightness side, the first correction information is chosen. The order of the priorities in the kinds of the main objects may be set in advance, or may be changed freely by a user. When the main objects in the same kind are detected from both detection image signals at the low brightness side and the high brightness side, the image capturing control unit 61 chooses one having a larger region where the main object occupies.

2. In a recognition result of the main object, on the basis of a matching of the reference information with the main object, the image capturing control unit 61 gives a priority to the main object having a higher matching score with the reference information. For example, when a score of the main object detected from the first detection image signal at the low brightness side is "81", and a score of the main object detected from the second detection image signal at the high brightness side is "90", the image capturing control unit 61 chooses the second correction information having the high score. Here, the kind of the main object detected from the first detection image signal at the low brightness side may be different from the kind of the main object detected from the second detection image signal at the high brightness side.

3. The above-described methods 1 and 2 may be combined. In this case, weighting of the score is set by a user in advance depending on the kinds of the main object. Here, it assumes the case that weighting of the human face is "1.4", and weighting of the vehicle is "1.1". When the score of the human face detected from the first detection image signal at the low brightness side is "81", and the score of the vehicle detected from the second detection image signal at the high brightness side is "90", Final score to human face=80×1.4=113.4

Final score to vehicle=90×1.1=99.

In this example, the final score of the human face is higher. Then, the image capturing control unit 61 determines the second correction information as the final correction information.

4. There are other various methods.

[7. Determination of Stop of Exposure for Detection]

By the correction of the control value of the exposure conditions for image output, the exposure time T0 is increased, which shortens a remaining time within one frame period from which the exposure time is subtracted. Accordingly, the exposure time for a detection may overflow from the remaining time within the frame period. In this case, meaningless exposure for detection will be performed, and a burden of the CPU 17 is increased wastefully.

Figure 15:
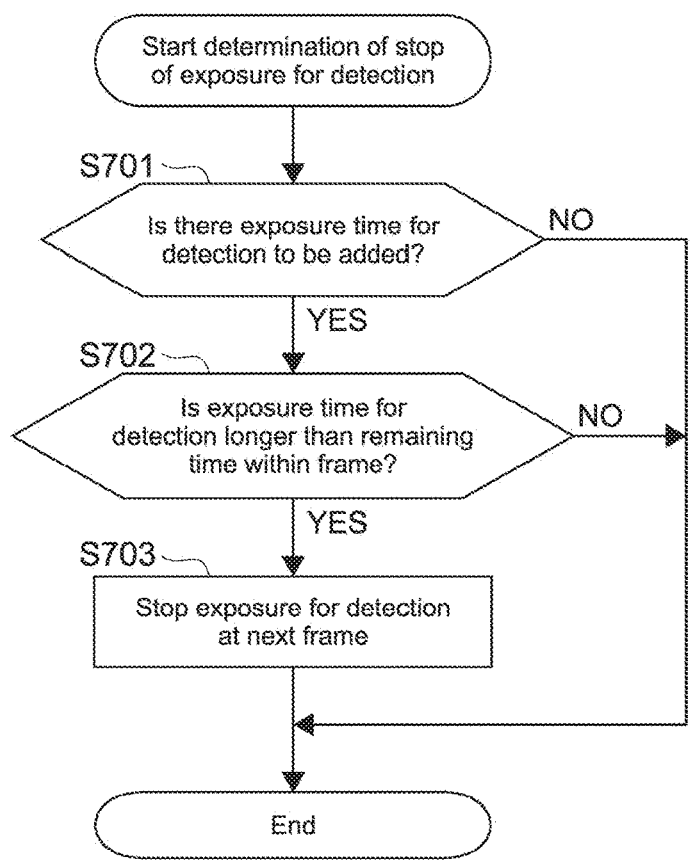
FIG. 15 A flowchart about determination of stop of exposure for detection.

Then, according to this embodiment, stop of determination of the exposure for detection is performed as follows:

FIG. 15 is a flowchart about the determination of stop of the exposure for detection.

The image capturing control unit 61 confirms whether or not the exposure time for detection (at least either one of T1 and T2) to be added to the next frame is requested in Step S103 and Step S104 of FIG. 7 (Step S701). When the exposure time for detection is not requested (No in Step S701), i.e., when the exposure for detection is not performed at the next frame, the operation is ended.

When the exposure time for detection is provided (Yes in Step S701), it determines whether or not the exposure time for detection is longer than the remaining time within one frame period from which the exposure time T0 for image output at the next frame is subtracted (Step S702).

Here, the exposure time for detection to be evaluated refers to the exposure time for detection to be added to the next frame out of the exposure time T1 for the first detection and the exposure time T2 for the second detection. For example, when both of the exposure time T1 for the first detection and the exposure time T2 for the second detection are requested, the time T1+T2 will be the exposure time for detection to be evaluated. When only one is added, only the exposure time for detection to be added is subjected for evaluation.

In this determination, when the exposure time for detection is not longer than the remaining time of the frame (No in Step S702), the operation is ended.

When the exposure time for detection is longer than the remaining time of the frame (Yes in Step S702), the image capturing control unit 61 invalidates adding the exposure time for detection at the next frame. In other words, the exposure for detection is stopped at the next frame (Step S703), and the operation is ended.

By choosing the determination of the stop of the exposure for detection, meaningless exposure for detection will be not performed, and the burden of the CPU 17 is not increased wastefully.

Alternative Embodiment 1

The respective histograms are generated from the image signal for output captured under the exposure conditions for image output, the first detection image signal and/or for the second detection image signal by the detecting unit 13. The CPU 17 integrates and visualizes information about the histograms, and displays the information on the displaying unit 15.

Figure 16:
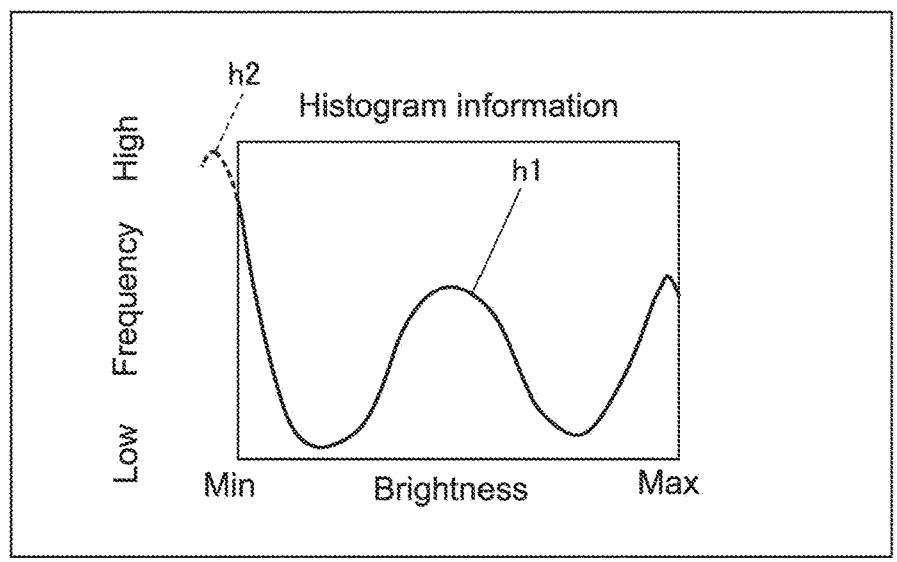
FIG. 16 A diagram showing respective histograms displayed continuously and integrally generated from an image signal captured under exposure conditions for image output and an image signal for the first detection.

FIG. 16 is a diagram showing the respective histograms displayed continuously and integrally generated from the image signal captured under the exposure conditions for image output and the image signal for the first detection.

This example illustrates the histogram in a coordinate space where a brightness value is assigned to a horizontal axis, and a pixel number is assigned to a vertical axis. The range of the brightness value based on the exposure conditions for current image output is represented by brightness value from the Min (lower limit value) to the Max (upper limit value). In other words, in the range of the brightness value, a solid line is the histogram of the image signal captured at the exposure conditions for the current image output (hereinafter referred to as a "histogram h1 for image output").

In this example, a part of the histogram generated from the first detection image signal at a low brightness side (hereinafter referred to as a "first detection histogram" is displayed continuously and integrally. A dotted line extending externally from the range of the brightness value to the low brightness side represents a detection histogram h2 of a part extracted from the first detection histogram.

In order to realize the display, the CPU 17 calculates the information about the image output histogram and the information about the first detection histogram acquired from the detecting unit 13 are compared to calculate a shift amount of the both histograms in the brightness axis direction. On the basis of the shift amount, the CPU 17 extracts the detection histogram h2 corresponding to the part at the lower brightness side than the Min (lower limit value) of the image output histogram h1 from the for the first detection histogram, and displays the detection histogram h2 in an identifiable form.

In this manner, the user may adjust manually the exposure by looking the histogram displayed on the displaying unit, for example. When the exposure is adjusted appropriately, the first detection histogram shown by the dotted line is not displayed. Then, the user can be aware of the completion of the exposure adjustment appropriately.

Here, the display of the first detection histogram generated from the first detection image signal at the low brightness side is described. Also, the second detection histogram generated from the second detection image signal at the high brightness side is displayed in the same manner.

Alternative Embodiment 2

In the above description, the exposure for detection is performed for every frame, and the control value of the exposure conditions for image output is corrected. For example, the correction and the correction of the control may be performed in a period of one time for an N frame. Here, N is an integer of 1 or more. Otherwise, it may be performed for a predetermined unit time.

The present technology may have the following configurations.

(1) An image capturing apparatus, including:
an image capturing unit having an image capturing device; and
a control unit that calculates a control value of exposure conditions on the basis of an image signal for output, the image signal for output being generated by exposing the image capturing device under the exposure conditions including an exposure time for image output for every unit time, and corrects the control value on the basis of a detection image signal, the detection image signal being generated by adding at least one of an exposure time for first detection longer than the exposure time for image output and an exposure time for second detection shorter than the exposure time for image output within a unit time.

(2) The image capturing apparatus according to the above (1), in which
the control unit is configured to, in the image signal for output, add the exposure time for the first detection when a percentage of the number of pixels having a brightness value corresponding to a lower limit value of a dynamic range of the image capturing device in all exceeds a first threshold value, and add the exposure time for the second detection when a percentage of the number of pixels having a brightness value corresponding to an upper limit value of a dynamic range of the image capturing device in all exceeds a second threshold value.

(3) The image capturing apparatus according the above (1) or (2), in which
the control unit is configured to
detect a main object from the detection image signal captured at at least one of the exposure time for the first detection and the exposure time for the second detection,
correct the control value so as to increase an exposure amount when the main object is detected from the image signal for the first detection captured at the exposure time for the first detection, and
correct the control value so as to increase an exposure amount when the main object is detected from the image signal for the second detection captured at the exposure time for the second detection.

(4) The image capturing apparatus according to the above (3), further including:
a detecting unit that generates histogram information showing a pixel number for every brightness value from the image signal for the detection, in which
the control unit is configured to
calculate position information of a representative brightness value of the main object in the histogram, and to correct the control value based on the position information.

(5) The image capturing apparatus according to the above (3) or (4), in which
the control unit is configured to
when the main objects are detected from both of the image signal for the first detection and the image signal for the second detection, compare detection results of the main objects,
select the position information calculated about one of the main objects on the basis of comparison results, and
correct the control value on the basis of the position information.

(6) The image capturing apparatus according to any of the above (3) to (5), in which
the control unit is configured to
lengthen the exposure time for the first detection when the representative brightness value of the main object detected from the image signal for the first detection is within the range near the lower limit value of the histogram, and
shorten the exposure time for the second detection when the representative brightness value of the main object detected from the image signal for the second detection is within the range near the upper limit value of the histogram.

(7) The image capturing apparatus according to any of the above (1) to (6), in which
the control unit is configured to
stop addition of the exposure time for the first detection and the exposure time for the second detection when the exposure time for the first detection and the exposure time for the second detection longer than a remaining time that the unit time is subtracted from the exposure time for detection.

(8) The image capturing apparatus according to any of the above (4) to (7), in which
the control unit is configured to
generate displaying data items in which the histogram information is visualized, and
display the displaying data items on a displaying unit.

DESCRIPTION OF REFERENCE NUMERALS 1 image capturing apparatus
11 image capturing unit
12 A/D converting unit
13 detecting unit
14 image processing unit
15 displaying unit
16 recording device
17 CPU
18 operating unit
20 program ROM
21 RAM
41, 43 image capturing lens
44 image capturing device
61 image capturing control unit
62 recording control unit
63 object recognizing unit

The invention claimed is:
1. An image capturing apparatus, comprising:
a central processing unit (CPU) configured to:
control an image capturing device to capture a first image at a first exposure time in a first frame period;
determine a first exposure condition of a first image signal that corresponds to the captured first image in the first frame period,
wherein the first exposure condition includes the first exposure time; and
add, at least one of a second exposure time or a third exposure time to the first exposure time, based on the determined first exposure condition,
wherein the at least one of the second exposure time or the third exposure time is added to the first exposure time in a second frame period that is next to the first frame period,
wherein the second exposure time is longer than the first exposure time, and
wherein the third exposure time is shorter than the first exposure time.

2. The image capturing apparatus according to claim 1, wherein the CPU is further configured to:
add the second exposure time to the first exposure time based on a first percentage, of a first number of pixels in each of a plurality of valid pixels of the image capturing device, that exceeds a first threshold value,
wherein the first number of pixels have a first brightness value that is lower than a lowest brightness value of a histogram, and
wherein the histogram is based on a dynamic range of the image capturing device; and add the third exposure time to the first exposure time based on a second percentage, of a second number of pixels in the plurality of valid pixels of the image capturing device, that exceeds a second threshold value,
wherein the second number of pixels have a second brightness value that is higher than a highest brightness value of the histogram.

3. The image capturing apparatus according claim 1, wherein the CPU is further configured to:
control the image capturing device to capture a second image at the second exposure time and a third image at the third exposure time;
detect an object from at least one of a second image signal or a third image signal,
wherein the second image signal corresponds to the second image, and the third image signal corresponds to the third image, and
wherein the second image signal comprises a first exposure amount and the third image signal comprises a second exposure amount;
increase the first exposure amount based on the detection of the object from the second image signal; and
decrease the second exposure amount based on the detection of the object from the third image signal.

4. The image capturing apparatus according to claim 3, wherein the CPU is further configured to:
generate histogram based on at least one of the second image signal or the third image signal,
wherein the histogram represents a relationship between a pixel number and a brightness value for at least one of the second image signal or the third image signal;
calculate first position that includes a first position of a first brightness value of the object that is detected from the second image signal;
calculate second position information that includes a second position of a second brightness value of the object that is detected from the third image signal; and
correct, a control value of a second exposure condition of an image for output, based on at least one of the calculated first position information or the calculated second position information.

5. The image capturing apparatus according to claim 4, wherein the CPU is further configured to:
compare a first detection result and a second detection result based on the detection of the object from each of the second image signal and the third image signal,
wherein the first detection result corresponds to the detection of the object from the second image signal and the second detection result corresponds to the detection of the object from the third image signal;
select one of the first position information or the second position information based on the comparison; and
correct the control value based on the selected one of the first position information or the second position information.

6. The image capturing apparatus according to claim 4, wherein the CPU is further configured to:
lengthen the first exposure time based on the first position information that indicates the first brightness value of the object is within a first range, wherein the first range includes a lowest brightness value of the histogram; and
shorten the second exposure time based on the second position information that indicates the second brightness value of the object is within a second range,
wherein the second range includes a highest brightness
value of the histogram.

7. The image capturing apparatus according to claim 1, wherein the CPU is further configured to:
stop, the addition of the at least one of the second exposure time or the third exposure time to the first exposure time, based on a condition,
wherein the condition includes the at least one of the second exposure time or the third exposure time that is longer than a remaining time, and
wherein the remaining time is obtained by a subtraction of the first exposure time from the second frame period.

8. The image capturing apparatus according to claim 1, wherein the CPU is further configured to:
generate a histogram based on the first image signal, wherein the histogram represents a relationship between a pixel number and a brightness value of the first image signal; and
display information related to the histogram on a displaying device.

9. An image capturing method, comprising:
by a central processing unit (CPU):
controlling an image capturing device to capture an image at a first exposure time in a first frame period;
determining an exposure condition of an image signal that corresponds to the captured image in the first frame period,
wherein the exposure condition includes the first exposure time; and
adding, at least one of a second exposure time or a third exposure time to the first exposure time, based on the determined exposure condition,
wherein the at least one of the second exposure time or the third exposure time is added to the first exposure time in a second frame period that is next to the first frame period,
wherein the second exposure time is longer than the first exposure time, and
wherein the third exposure time is shorter than the first exposure time.

10. An image capturing apparatus, comprising:
a central processing unit (CPU) configured to:
control an image capturing device to capture a first image at a first exposure time in a first frame period;
determine an exposure condition of a first image signal that corresponds to the captured first image in the first frame period,
wherein the exposure condition includes the first exposure time;
add, at least one of a second exposure time or a third exposure time to the first exposure time, based on the determined exposure condition,
wherein the at least one of the second exposure time or the third exposure time is added to the first exposure time in a second frame period that is next to the first frame period,
wherein the second exposure time is longer than the first exposure time, and
wherein the third exposure time is shorter than the first exposure time;
control the image capturing device to capture a second image at the second exposure time;
control the image capturing device to capture a third image at the third exposure time;
detect an object from at least one of a second image signal or a third image signal,
wherein the second image signal corresponds to the second image and the third image signal corresponds to the third image and
wherein the second image signal comprises a first exposure amount and the third image signal comprises a second exposure amount;
increase the first exposure amount based on the detection of the object from the second image signal; and
decrease the second exposure amount based on the detection of the object from the third image signal.

11. An image capturing apparatus, comprising:
a central processing unit (CPU) configured to:
control an image capturing device to capture an image at a first exposure time in a first frame period;
generate a histogram based on an image signal that corresponds to the captured image in the first frame period,
wherein the histogram represents a relationship between a pixel number and a brightness value of the image signal;
display information related to the histogram on a displaying device;
determine an exposure condition of the image signal based on the information related to the histogram,
wherein the exposure condition includes the first exposure time; and
add, at least one of a second exposure time or a third exposure time to the first exposure time, based on the determined exposure condition,
wherein the at least one of the second exposure time or the third exposure time is added to the first exposure time in a second frame period that is next to the first frame period,
wherein the second exposure time is longer than the first exposure time, and
wherein the third exposure time is shorter than the first exposure time.

* * * * *